Patented July 3, 1934

1,964,983

UNITED STATES PATENT OFFICE 1,964,983

CUTTING FLUID

Benjamin Gallsworthy, Glenham, N. Y., assignor to The Texas Company, New York, N. Y., a corporation of Delaware No Drawing. Application May 27, 1932,
Serial No. 614,049

7 Claims. (Cl. 87—9)

This invention relates to cutting fluids and more particularly to sulfurized oils suitable for use in the lubrication of cutting tools and the like.

According to the present invention, hydrocarbon oils are treated with sulfur and sulfur chloride at a temperature such as to cause an amount of sulfur suitable for the production of a satisfactory cutting fluid to be incorporated into the oil.

Heretofore, sulfur cutting oils free from fatty acids and consisting principally of an ordinary mineral oil and a minor amount of sulfur have been difficult to prepare unless the sulfur was incorporated at a low temperature into the oil in a colloidal form, or unless the sulfur was digested with the oil at an elevated temperature whereby a considerable amount of darkening in color and substantial sludge formation in the oil occurred. It has been customary, therefore, to use unusual samples of oils; such as one having a naturally high sulfur content or certain extracts of oils, for example, a sulfur dioxide extract; and then incorporate free sulfur into these special products. It has also been proposed, in the past, to produce cutting oils by reacting the oil with large quantities of sulfur chloride, but this method is quite expensive and usually results in the introduction of large quantities of chlorine into the oil.

Instead of treating the oil with sulfur or sulfur chloride only, I have found that sulfur may be incorporated into a mineral oil to produce an improved cutting fluid by reacting the oil under suitable conditions with both sulfur and sulfur chloride. I do not propose any theory of the reactions involved but by treating an oil with sulfur chloride in the presence of free sulfur I have found that the desired amount of sulfur may be introduced into the oil in a more efficient and economical manner than by either of the reagents separately, and an improved stable cutting oil obtained.

As an example of my invention, a mineral oil distillate having a viscosity of about 100 seconds Saybolt at 100° F. was mixed with approximately 1½% of sulfur and the mixture heated to about 260° F. Sulfur chloride was then slowly added to the hot mixture, over a period of about five hours, until about 3% had been added. The resulting product showed a sulfur content of about 3% and was a highly satisfactory cutting oil. To further illustrate the invention, another oil of about the same viscosity as the above sample was digested for a short time with approximately 3% of sulfur at about 250° F. and then 5% sulfur chloride was slowly added at the same temperature over a period of about 13 hours. A stable cutting oil was obtained having a sulfur content of approximately 4%.

The viscosity of the mineral oil is not limited to 100 seconds Saybolt at 100° F., but may range from about 50-200 seconds Saybolt at 100° F.; also the temperature of the reaction may be as low as 200° F. in some cases and as high as 400° F. in others, depending on the type of oil used. In order to prevent large losses of sulfur as gases, such as hydrogen sulfide, or sulfur chloride, at high temperatures, it is sometimes advantageous to carry out the operation under pressure, say from 50-200 lbs. per sq. in. The operation of the process under pressure, wherein the gases are confined, tends to provide more favorable conditions for the reaction and facilitates the introduction of the sulfur into the oil.

The amount of free sulfur which may be added to the oil will depend on the conditions and the quantity of sulfur desired to be incorporated into the oil. When operating under pressure, less sulfur is usually required since the loss is smaller than when no pressure is used. The same holds true for sulfur chloride. In general, however, I may use about 1-3% of sulfur and about 1-5% of sulfur chloride. It is preferred that the finished oil contain at least 2% of sulfur but the sulfur content may range from 1-5% for different oils with good results.

Obviously, many modifications and variations of the invention, as hereinbefore set forth, may be made without departing from the spirit and scope thereof, and therefore only such limitations should be imposed as are indicated in the appended claims.

I claim:

1. The method of producing cutting oils which comprises treating a hydrocarbon oil with an amount of free sulfur larger than normally forms a stable product and sulfur chloride at a temperature sufficient to produce a substantially stable cutting oil.

2. The method of producing a sulfurized cutting oil which comprises treating a hydrocarbon oil with sulfur chloride in the presence of a substantial amount of free sulfur at a temperature sufficient to combine a larger amount of said free sulfur with the oil in substantially stable form than normally occurs without the sulfur chloride at said temperature.

3. The method of preparing sulfur cutting oils which comprises reacting a mineral oil while hot with free sulfur and sulfur chloride under a substantial superatmospheric pressure.

4. The method of producing a sulfurized cutting oil which comprises reacting sulfur chloride with a mineral oil to which has been added an amount of free sulfur larger than normally forms a stable product while maintaining a temperature of about 200° F.–400° F. whereby a substantially stable sulfurized product is obtained.

5. The method of producing a sulfurized cutting oil which comprises incorporating in unstable combination about 1-3% of free sulfur into a hydrocarbon oil and then introducing an additional amount of sulfur into the oil by reacting the resulting product with sulfur chloride thereby obtaining a finished product containing the total sulfur so introduced in substantially stable form.

6. The method of producing a sulfurized cutting oil which comprises maintaining a hydrocarbon oil at a temperature of about 200° F.–400° F. in the presence of free sulfur until upwards of about 1% of sulfur is absorbed by the oil in relatively unstable form, then slowly adding sulfur chloride to produce a substantially stable sulfurized cutting oil having a substantially stable total sulfur content of at least 2%.

7. The method of sulfurizing oils which comprises subjecting a mineral oil, while in the presence of free sulfur and sulfur chloride and under a superatmospheric pressure of at least 50 lbs. per sq. in., to a temperature sufficient to incorporate a substantial amount of sulfur in the oil.

BENJAMIN GALLSWORTHY.